March 4, 1958
N. M. ROBBOY
2,825,586
SWIVEL JOINT FOR ELECTRICAL CONDUIT
Filed April 18, 1956
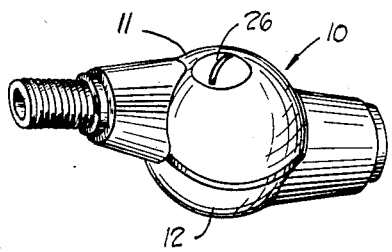
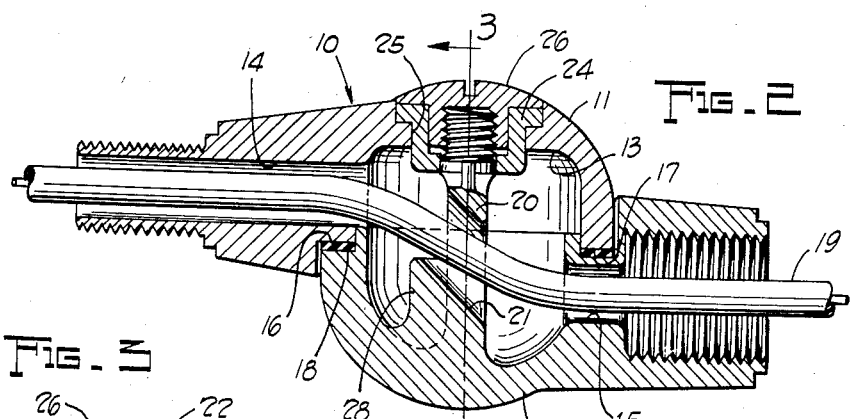
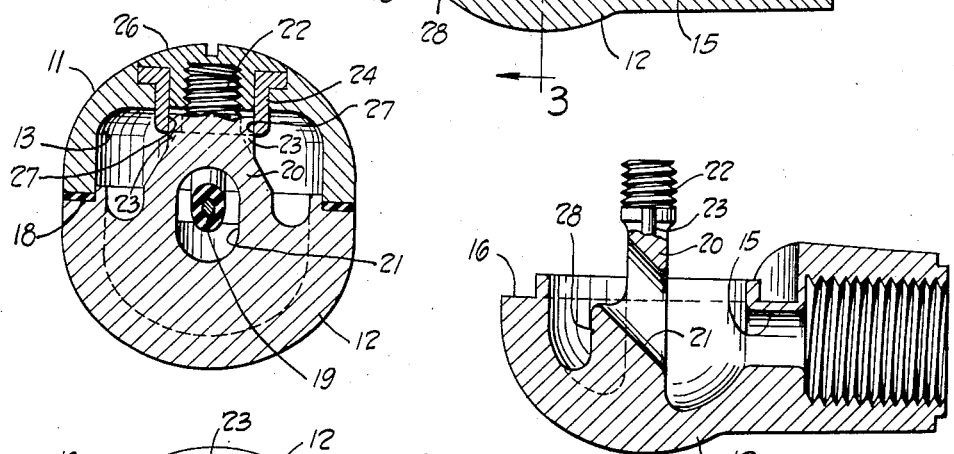
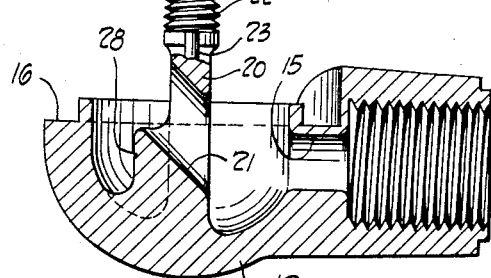
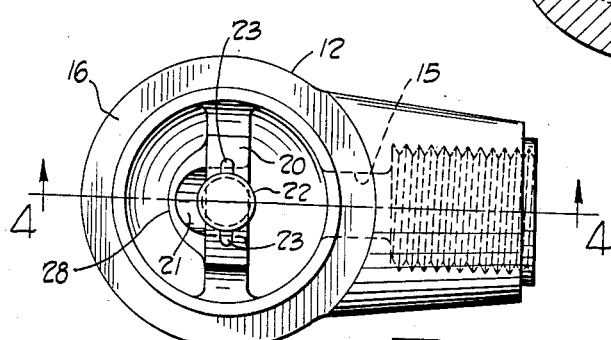
INVENTOR.
NATHAN M. ROBBOY
BY Sanford Schnurmacher
ATTORNEY.

United States Patent Office 2,825,586
Patented Mar. 4, 1958

2,825,586

SWIVEL JOINT FOR ELECTRICAL CONDUIT

Nathan M. Robboy, Cleveland Heights, Ohio

Application April 18, 1956, Serial No. 578,942

1 Claim. (Cl. 285—181)

This invention relates to swivel joints and particularly to a swivel joint for electrical conduits.

Conducive to a better understanding of this invention, it may be well to point out that swivel joints between electrical conduit pipes or tubes are commonly found in electric fixtures and tools that require frequent and free adjustment of the operative element with reference to a fixed source of electric power.

Such swivel joints are usually composed of two hollow housings or elements that pivot about a center post. Each half of the joint has a socket to receive a conduit pipe and the two conduit pipes, so joined, may then be adjusted relative to one another around a center fixed by the center post of the swivel. The electric cable is then inserted through the joint by pushing it through one of the conduits into the joint and then out of the joint into the second conduit.

Since all such joints have a solid center post, such as a bolt or rod, it has been found very difficult to pass the cable through the assembled joint, since by reason of the mechanical construction of such joints the conduit sockets lie in spaced parallel planes. Furthermore, the compact structure required by such joints provides little or no space for the manipulation of the wire around the center post from one socket plane to the other.

The primary object of this invention, therefore, is to provide an improved swivel joint for electrical conduits whose physical structure affords a clear and direct passageway through the assembled joint for an electric cable.

Another object is to provide a joint of the type stated in which the center post presents no obstacle to the passage of an electric cable therethrough.

A further object is to provide a swivel joint having a passageway directly through the center post thereof, said passageway being aligned with the natural path of the cable between the entering and exit sockets.

Another object is to provide a swivel joint that will hold its adjustment under conditions of severe vibration, while at the same time being easily moveable to a new position when desired.

Still another object is to provide a joint of the type stated that will be safe and free from the fire hazard, since the enclosed electric cable does not have to be sharply bent or twisted in order to pass through the joint and thus will be less likely to fail because of mechanical rupture.

These and other objects of the invention will become apparent from a reading of the following specification and claim, together with the accompanying drawing wherein like parts are referred to and indicated by like reference characters, and wherein:

Figure 1 is a perspective view of the assembled swivel joint for electric conduits that is the subject of this invention;

Figure 2 is a longitudinal sectional view of the assembled swivel joint, showing an electrical cable passed therethrough;

Figure 3 is a cross sectional view of the same, taken along the line and in the direction of the arrows 3—3 of the Figure 2;

Figure 4 is a longitudinal sectional view of the lower housing half, taken along the line and in the direction of the arrows 4—4 of the Figure 5; and Figure 5 is a top plan view of the lower housing half.

Referring more particularly to the drawing, there is seen the assembled swivel joint that is the subject of this invention, broadly indicated by reference numeral 10.

The joint 10 is preferably made of a non-corrosive material such as brass or aluminum, although any other material having suitable physical characteristics may be used.

The device comprises two interfitted hollow housing halves 11 and 12 joined face to face to form a cavity 13 therebetween.

The upper half 11 has a socket bore 14 extending laterally of the cavity 13, while the lower half 12 has a similar laterally extending socket bore 15. The socket bores 15 and 14 may be either internally or externally threaded for attachment to suitable conduit pipes, not shown.

The upper housing half 11 has a circular seat 17 which mates with a similar circular seat 16 in the lower housing half 12. A metal or fiber ring 18 is positioned between the two seats 16 and 17 and provides a bearing surface upon which the two halves may be swiveled, as seen in Figures 1, 2 and 3.

When the two halves are so assembled, it will be noted that the socket bores 14 and 15 are spaced vertically in parallel planes.

Reference numeral 20 indicates a center post or partition that extends vertically of the lower housing half 12, and formed integral therewith. The post 20 has a thick base 28 and a smaller threaded upper end 22. Two diametrically spaced ears 23 are positioned at the top end of the post 20 just below the threaded portion 22.

An angularly inclined opening or bore 21 extends through the base 28 of the post 20. The bore 21 is positioned on the projected center line of the socket bores 15 and 16 and is so angled that the ends of the bore 21 face toward the socket bores 14 and 15. In effect, the post bore 21 is an extension or continuation of the socket bores 14 and 15, such that an electric cable 19 may pass through the joint 10 in an easy full flowing curve, as is seen most clearly in Figure 2.

Reference numeral 24 indicates a bearing cup or sleeve which is journaled in a bore 25 in the upper housing half 11, as seen in Figures 2 and 3. The bearing 24 has two diametrically spaced slots 27 which receive the ears 23 of the post 20, as is seen most clearly in Figure 3. When the post and bearing are so assembled, the bearing sleeve 24 and post 20 are locked together against relative rotation. A nut 26 seated within the bearing cup 24 engages the threaded end 22 of the post 20 which extends through the bearing opening. Nut 26 acts to draw the two halves 11 and 12 of the housing 10 together against the upper and lower faces of the swivel ring 18.

It will now be evident that the housing halves, so joined, are free to swivel relative to one another about the center post 20. The freedom of movement of the so joined halves is determined by the degree of pressure exerted by the nut 26 in pulling upon the post threads 22.

It should be noted in Figures 2 and 3 that nut 26 does not bear against the upper housing half 11, but only against the upper face of the bearing cup 24. Thus the swiveling of the upper housing half 11 relative to the bearing cup 24 and attached post 20 does not disturb the setting of the nut 26. Thus the joint will permanently maintain the resistance to rotation once set.

Again as pointed out hereinbefore, the angular alignment of the post bore 21 with the socket bores 14 and 15 provides an unobstructed path of travel through the joint 10 for the cable 19. This structure makes possible a considerable saving in labor cost, since the cable may be easily inserted through the joint without the necessity of working it around a center post such as is present in all such joints. The clear path not only results in labor savings, but also provides a safer electrical joint since the cable is only subjected to a gradually flexing when the joint is swiveled, instead of the sharp distortion which occures when the cable must be twisted around a center post. Furthermore, the construction permits the use of heavier insulation on the cable, since the diameter of the cable need not be restricted in order to pass through the joint.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

A swivel connector for electric conduits, comprising in combination, a hollow housing including two mating halves having opposed circular seats and threaded conduit engaging sockets extending laterally of said seats for the passage therethrough of an electric cable; a flat ring engaged with both seats and positioned therebetween, the said housing halves being free to swivel on said ring relative to one another; one of the housing halves having a center partition positioned cross-wise of the socket, said partition having a laterally extending lip portion, at the approximate height of the circular seat, on its side opposite to the socket, and a cylindrical threaded portion at its upper end including diametrically opposed ears, below the threaded portion, the partition also having a transverse inclined bore therethrough extending from the top of the lip toward the lower wall of the socket bore; the other of said housing halves having a bearing cup rotatably mounted at the center thereof, aligned with the top end of the threaded cylinder of the first housing half, and including diametrically spaced slots engageable with the aforesaid cylinder ears, to lock the bearing cup and partition together; and screw means engaged with the cylinder threads and bearing against the top face of the bearing cup to hold the two housing halves together at the bearing cup.

References Cited in the file of this patent

UNITED STATES PATENTS

| | | |
|---|---|---|
| 359,394 | Jones et al. | Mar. 15, 1887 |
| 478,417 | Drew | July 5, 1892 |